(12) United States Patent
Vishnevskiy et al.

(10) Patent No.: US 12,303,764 B2
(45) Date of Patent: May 20, 2025

(54) SYSTEM AND METHOD FOR SPORTS SCORING

(71) Applicants: Igor Vishnevskiy, San Diego, CA (US); Stephen Jester, San Diego, CA (US)

(72) Inventors: Igor Vishnevskiy, San Diego, CA (US); Stephen Jester, San Diego, CA (US)

( * ) Notice: Subject to any disclaimer, the term of this patent is extended or adjusted under 35 U.S.C. 154(b) by 329 days.

(21) Appl. No.: 18/117,876

(22) Filed: Mar. 6, 2023

(65) Prior Publication Data

US 2023/0285834 A1  Sep. 14, 2023

Related U.S. Application Data

(60) Provisional application No. 63/318,989, filed on Mar. 11, 2022.

(51) Int. Cl.
*A63B 71/06* (2006.01)
*A63B 69/00* (2006.01)
*G06T 7/246* (2017.01)
*G06T 7/66* (2017.01)

(52) U.S. Cl.
CPC ...... *A63B 71/0605* (2013.01); *A63B 69/0068* (2013.01); *G06T 7/248* (2017.01); *G06T 7/66* (2017.01); *A63B 2220/05* (2013.01); *A63B 2220/806* (2013.01); *G06T 2207/10016* (2013.01); *G06T 2207/20081* (2013.01); *G06T 2207/20084* (2013.01); *G06T 2207/30196* (2013.01)

(58) Field of Classification Search
CPC ............ A63B 71/0605; A63B 69/0068; A63B 2220/05; A63B 2220/806; G06T 7/66; G06T 7/248; G06T 2207/10016; G06T 2207/20081; G06T 2207/20084; G06T 2207/30196
USPC ........................................................... 700/92
See application file for complete search history.

(56) References Cited

U.S. PATENT DOCUMENTS

| | | | |
|---|---|---|---|
| 6,837,497 B2 * | 1/2005 | Barnett | A63B 67/00 273/459 |
| 9,892,655 B2 * | 2/2018 | Snow | G16H 40/67 |
| 11,295,527 B2 * | 4/2022 | Gazioglu | G06T 11/203 |
| 11,511,156 B2 * | 11/2022 | Shavit | A61B 5/1123 |
| 2010/0083911 A1 * | 4/2010 | Gardner | A01K 15/02 119/856 |

* cited by examiner

*Primary Examiner* — Allen Chan
(74) *Attorney, Agent, or Firm* — Barry Choobin; Patent 360

(57) ABSTRACT

A system and method for scoring the performance of a performer in a sport, such as bull riding and gymnastic competitions. The scoring can be done using a video feed of a performance. Computer vision of the system can detect predefined body parts of the performer in frames of the video feed. Thereafter, geometric centers of the predefined body parts can be defined. Thereafter, a framework can be built by connecting the geometric centers and spatiotemporal changes in the framework can be tracked for determining predefined body movements. A scoring module based on deep neural network can score the performance using the predefined body movements.

18 Claims, 6 Drawing Sheets

SYSTEM AND METHOD FOR SPORTS SCORING

CROSS-REFERENCE TO RELATED APPLICATIONS

This application claims priority from a U.S. Provisional Patent Appl. No. 63/318,989 filed on Mar. 11, 2022, which is incorporated herein by reference in its entirety.

FIELD OF INVENTION

The present invention relates to a system and method for sports scoring, and more particularly, the present invention relates to automation of sports scoring using artificial intelligence and image recognition algorithms.

BACKGROUND

Judged sports fall in category of performance sports in which judges score the performance. Examples of such judged sports include gymnastics and bull riding. In judged sports, the performance is judged based on predetermined rules and standards. One or more judges trained with the rules and standards analysis each movement based on established rules and standards to assign scores. The entire performance can be broken down into different tasks and each can be assigned a quantitative score by the judges. The overall score for the complete performance can then be determined from sub-scores.

The scoring in judged sports is often criticized because of the large amount of variability in assessing the performance by human judges. There are several factors that affect the accuracy and quality of judging a performance. Besides being subjective, human bias is also inherent in the judging process. Experience, training, and understanding of the judges also vary in assessing the movements in a performance based on predetermined rules.

Recently, efforts have been made to use technology in assisting the judges for assessing performance in order to reduce variability. Typically, sensors are placed over the body of the performer, such as a gymnast or athlete, and the trajectory of body parts in space can be accessed by software. The said method has several drawbacks and limitations, the primary drawback is the use of sensors that must be attached to the performer.

A need is therefore appreciated for a system and method for automated scoring in judged sports that overcomes the aforesaid drawbacks and limitations with known system and human judgments.

The term object herein refers to human, animal, or both.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method for automated scoring in judged sports using computer vison and deep neural networks.

It is another object of the present invention that the scoring can be performed in real time or later.

It is still another object of the present invention that no sensors need to be placed on the body of an athlete.

It is a further object of the present invention that the implementation of the disclosed method is economical.

It is yet another object of the present invention that the disclosed system and method can be easily adapted for different judged sports.

It is a further object of the present invention that the system and method allow scoring using a video of performance.

In one aspect, disclosed is an artificial intelligence, image recognition, and deep neural networks based automated scoring system to score object's movement in sports.

In one aspect, disclosed are a system and method for automation of the scoring in sports using artificial intelligence, deep neural networks, and image recognition to derive the scoring of each of the related sport and competition related objects after predicting/detecting each part of the related sport and competition related objects such as athlete's body, and analyzing the movement and change in angle of each part of the body and/or two or more parts of the body in relation to each other.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
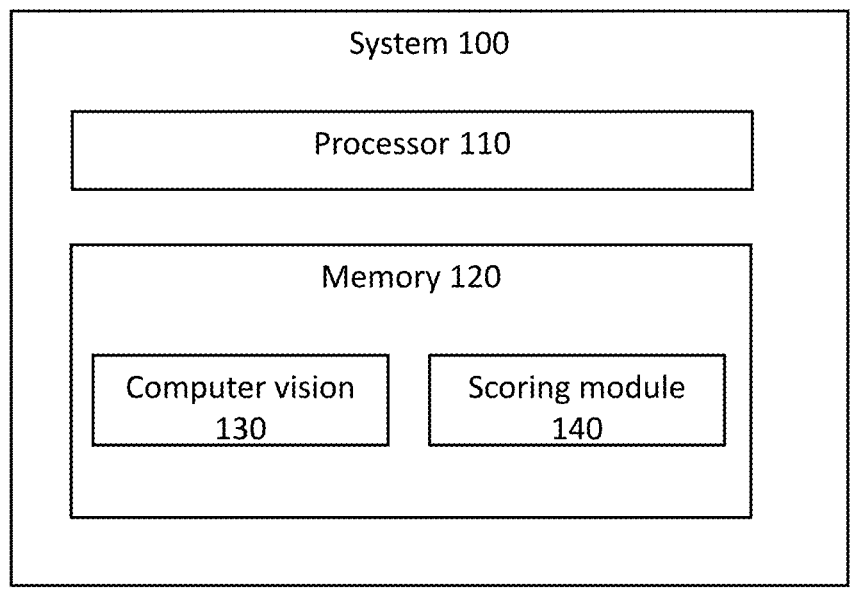
FIG. 1 is a block diagram showing an architecture of the disclosed system, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

The disclosed system and method for automated scoring can overcome the drawbacks and challenges in judging by humans. The disclosed system and method can be used for automated scoring as well as can assist the judges in scoring. The disclosed system and method can be used to score live sports i.e., in real time as well as later using the recorded video of the act.

Disclosed are a system and method for automated scoring in performance related sports i.e., judged sports. The disclosed system and method can provide for automated scoring in sports, such as gymnastic competitions, bull riding sports, and the like. The disclosed system and method can be adapted for any sports or performance in which one or more judges evaluate an act by comparing the movements in the act with pre-determined rules or standards. For example, in the sport of bull riding, multiple riders compete, and a set of points are awarded to the rider based on performance of both the bull and the rider, such as body balance of the rider on the bull and the efforts made by the bull. The evaluation by judges is not random but based on predefined standards and rules. The judges are trained based on established standards and rules, and a judge takes into account various learned factors while giving a score. The disclosed system can learn through its deep neural network the various standards and rules for scoring. The disclosed system can detect and track movements for scoring based on computer vision.

Hereinafter, a performer whose performance has to be judged is also referred to as an object, and the object includes an animal or human being, or a combination of both. For example, in the sport of bull riding, the bull is referred to as an object, similarly the rider is referred to as an object, and the two objects can be considered different by the disclosed system. Alternatively, the bull and the rider riding the bull can be considered as a single object by the disclosed system.

The disclosed system and method provide for projecting the object into a skeleton framework made of vectors that can provide for spatiotemporal tracking of movements of the parts of the object in a 2D or 3D space. The disclosed system and method through computer vison can recognize various body parts of the object. For example, the bull as an object can have a head, torso, hips, and four legs. The movement occurs at joints, such as hip joint, spine, and the like. The disclosed system can be trained to recognize various body parts, such as using computer vision and image recognition algorithms. Each part can be virtually defined and distinguished from other parts. Thereafter, a geometric center of each part can be determined by the disclosed system. The framework can extend through geometric centers, wherein the framework has rigid legs joined with each other through flexible joints.

Referring to FIG. 1 which is a block diagram showing an exemplary embodiment of the present invention. System 100 can include a processor 110 and a memory 120. The processor can be any logic circuitry that responds to, and processes instructions fetched from the memory. The memory may include one or more memory chips capable of storing data and allowing any storage location to be directly accessed by the processor. The memory includes modules according to the present invention for execution by the processor to perform one or more steps of the disclosed methodology. Chiefly, the memory can include a computer vision 130 and a scoring module 140. The computer vision upon processing by the processor can identify objects in frames of the video. Computer vision can further distinguish different body parts of objects. The computer vision can then define a geometric center, also referred to herein as centroid, of each body part, and generate the framework for the object. The computer vison can track spatiotemporal changes in the framework and the tracked data can be received by the scoring module. The scoring module can provide a score using the deep neural networks.

Figure 2:
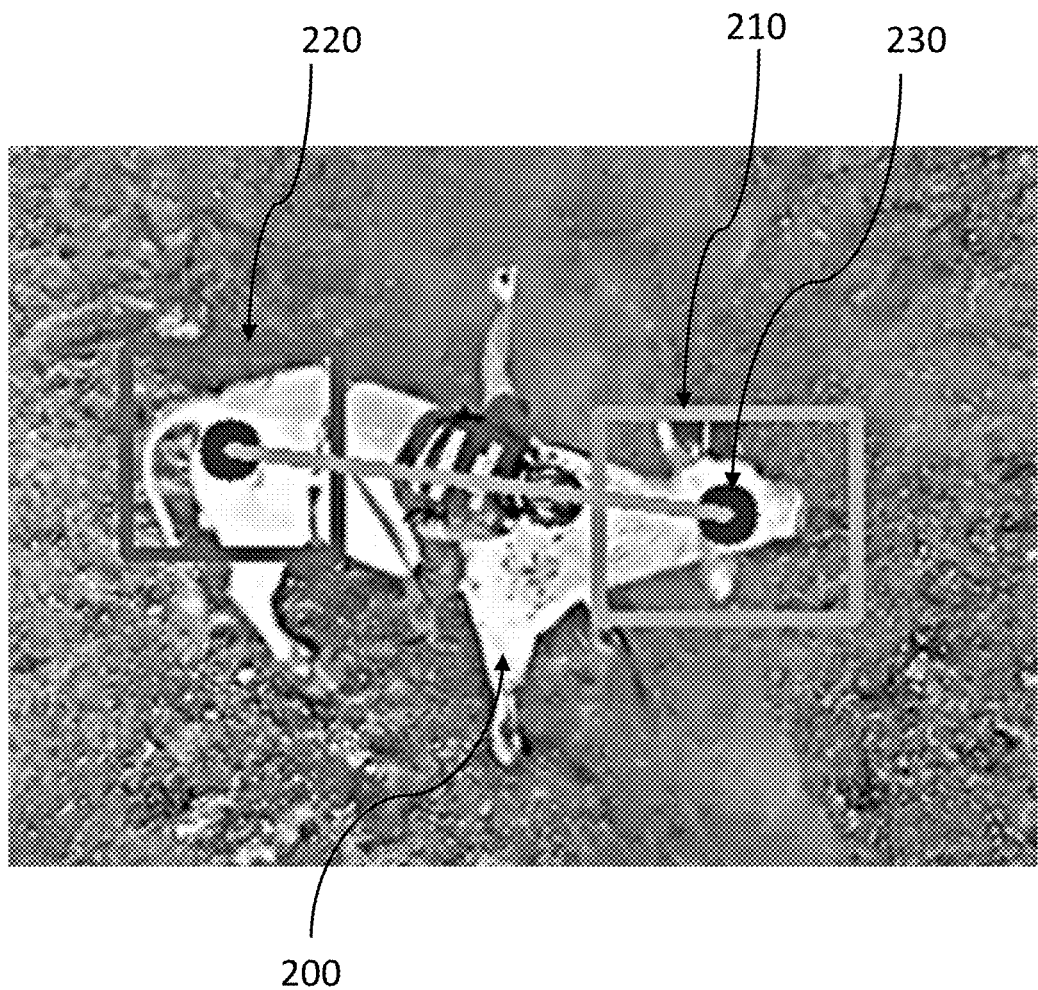
FIG. 2 is a schematic view showing recognition of body parts of a bull in a sport of bull riding from the images, according to an exemplary embodiment of the preset invention.

Referring to FIG. 2 which shows a bull from a top view. The video can be captured from one or more angles, from one of many sides and/or from top. The system can receive a single feed from one camera or multiple feeds from a different camera. Multiple cameras can be used to capture video from different side positions. The video herein refers to frames in sequences, wherein the number of frames per second may vary. The requirement of spatial resolution and temporal resolution i.e., resolution of video and frame rate may vary and can depend upon the sports to be judged.

As shown in the drawing, the two distinct parts along the head and the hip of the bull are distinguished and imaginary boundary circumscribing the differentiated parts can be assumed. The front box 210 shows the head part and the rear box 220 shows the tail part of the bull 200. For each part, a geometric center can then be defined, shown by the dark sphere 230 in the center of the box. Both differentiating the part and defining a center can be taught to the machine learning model, for example, using supervised training.

The rigid leg of the framework can be assumed to extend between the head center and tail center, wherein movement in the rigid leg can be used to calculate the spine of the bull. Similarly, the disclosed system can track the angle change between parts of the object by simulating a skeleton framework.

Figure 3:
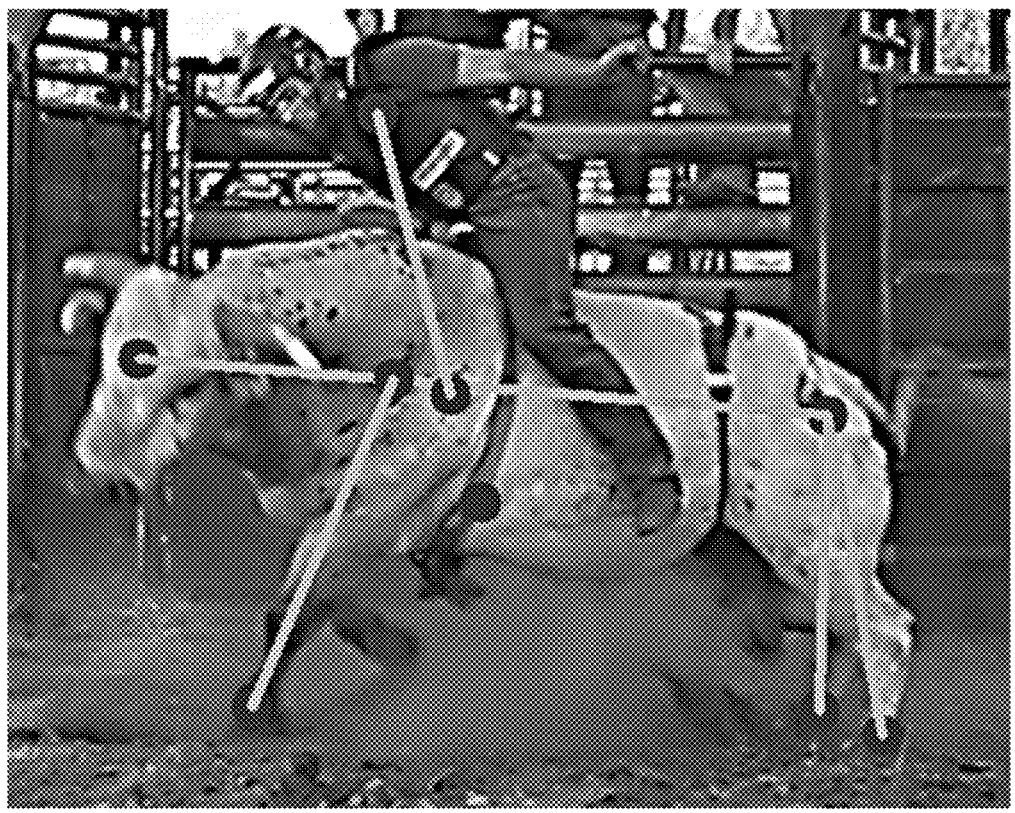
FIG. 3 is a side view showing a framework made by joining centroids of body segments/areas/volumes as shown in FIG. 1, according to an exemplary embodiment of the preset invention.
Figure 4:
FIG. 4 shows a movement of the bull and spatial changes in the framework for evaluating the movements of the body parts of the bull in relation to each other, according to an exemplary embodiment of the preset invention.
Figure 5:
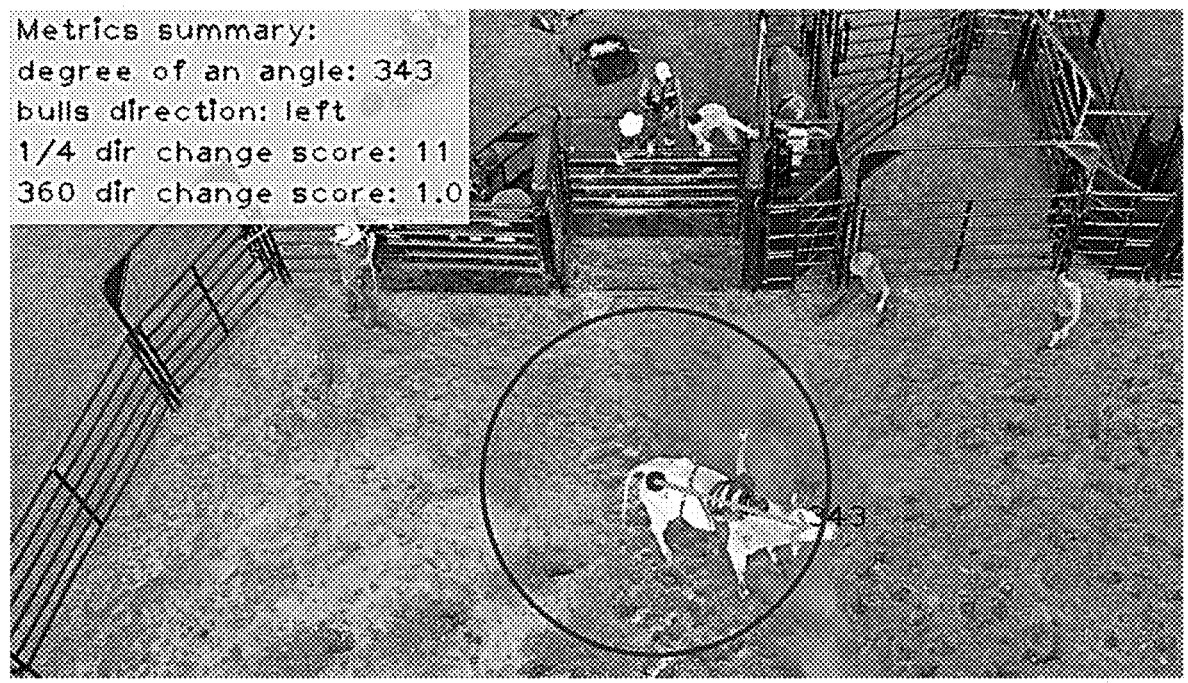
FIG. 5 shows a framework of the top of the bull for determining direction of rotation of the bull and degree of rotation, according to an exemplary embodiment of the preset invention.

FIGS. 3 and 4 show a side view of the bull, in FIG. 3 rider is shown to be part of the bull as an object and FIG. 4 shows the framework only encompassing the bull. Thus, the disclosed system allows for defining an object i.e., the object can include either the bull or the rider or both. The framework includes rigid legs that extend between the geometric centers, the geometric centers shown by a solid circle. The rigid lines can flex relative to each other at the joints connecting the rigid legs. The joints in the framework can be at the geometric centers, however, any variation in positioning of joints of the framework is within the scope of the present invention. With the movement of the bull, the frame collapses and expands according to the movements of the object. Perhaps, each part can be considered as a volume in 3D cartesian coordinate system. The rigid legs of the framework as vectors can extend from the centroid of volume, also referred to herein as geometric center of the volume. It is understood that multiple legs can extend from each centroid, wherein the number of distinguished volumes can be increased or decreased. The centroids of any number of volumes can be connected to provide a complex framework that can better detect fine motor movements in the object. Thus, by tracking the changes in framework in space with time, movement of arms, legs, back, and head of the bull can be determined in different directions. The scoring module can then compare these movements of the bull with pre-defined or learned standards and rules and provide a score. A resultant vector for each centroid can be determined and that vector can define the direction and angle of movement of the part of the object. The complete 360 spin of the bull can also be determined by tracking the changes in the framework with time. FIG. 5, which is a top view of the bull shows a resultant vector that can be used to measure the degree of spin of the bull and can determine the direction of the spin i.e., left or right.

In another implementation, the body can be projected onto a 2D cartesian coordinate system. The frames of the video feed can be converted to pixel data. The predefined body parts can be recognized as areas in the frames and the pixels associated with the areas. The geometric center of the area can be determined, and the framework can be built.

Thus, by using the computer vison and artificial intelligence, the inherent subjectivity, bias, and variability in human judgment can be avoided. The disclosed system and method can be used to judge the performance as well as aid the human judges to score the performance. The disclosed system and method can precisely track changes in position of body parts relative to each other, such as change in angle between the object's spine and object's legs, and the same can be used for scoring, avoiding any variance and subjectivity of human judge. The disclosed system and method can track direction, angle, speed, trajectory, and the like parameters for any body part of an object relative to other parts. Which parts or combination of parts have to be analyzed can depend upon the scoring method and standards. For example, the scores of the performer may depend on pre-defined movements and balance. The scoring module can be trained to track and precisely determine these movements quantitatively and generate a quantitative point. The points can then be summed to derive an overall score for the performance.

Suitable matrix equations can define the 3D framework, and parameters generated from change in the structure of the framework can be used to solve the matrix equations to determine the quantitative data for body movements that is received by the scoring module. Examples of body movements in bull riding include full 360 spins, change of direction, bucking and movement agility.

FIGS. 3-6 demonstrate how the disclosed system can detect the head of the bull, the back of the bull, pair of front legs, pair of rear legs, rider, and the bull itself from the side video footage. Each part can be considered as a volume and knowing the coordinates of each predicted part of the body on each frame of the video, a geometric center or centroid of the each predicted/detected parts of the body can be calculated. The solid marker circle in the drawings indicate this centroid. By connecting the centroids, the framework can be generated. The changes in skeleton framework including position of centroids and angles between the legs of the framework can be tracked over time, which corresponds to actual movements in the body part. For example, by capturing and tracking the change in coordinates of each part of the bull's body, the system can calculate, measure, and score the agility in the form of jumps of the bull. By capturing and tracking the difference in angle between the spines of rear legs and the spine of the back of the bull, the system can calculate the level of and score the bucking of the bull. By detecting the absence of the rider on the bull, the system can detect the exact moment when the rider jumped off the bull.

The computer vision model can be trained to recognize parts of the object that are significant for scoring, distinguish the parts, and determine a geometric center of each distinguished part. Then using suitable matrix equations, the changes in the framework over time can be quantified and this data can be used by the scoring module. Any off-the-shelf video equipment could be used to capture the video feed of the athlete's performance. Various deep neural network algorithms could be used to train the computer vision models. Examples include, but are not limited to YOLO and MaskRCNN open-source algorithms as well as unique computer vision DNNs built in house. The training data comes in a form of parsed video frames into images, which are then annotated, highlighting the body parts of the athlete's body, which we need model to detect for us to be able to automate the scoring, using unique matrix equations built in house.

Figure 6:
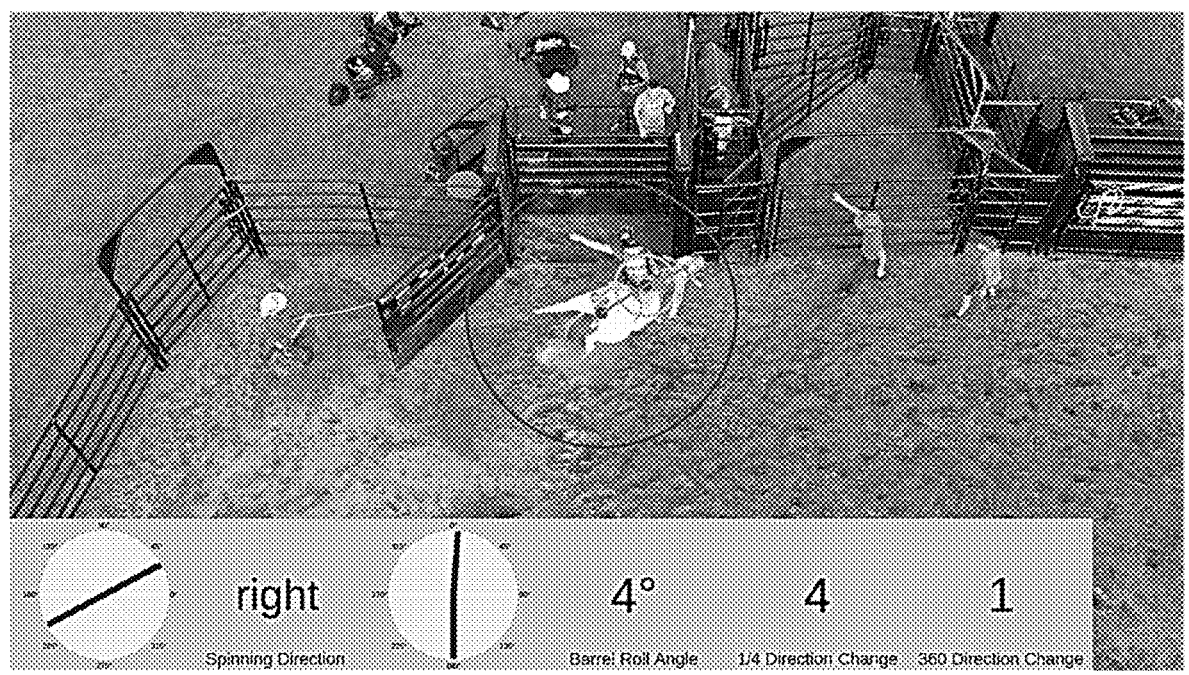
FIG. 6 shows another interface of the bull riding, according to an exemplary embodiment of the preset invention.

The disclosed system can also provide an interface showing the video, the framework overlay on the video, and different parameters calculated by the disclosed system, as shown in FIGS. 4 and 6. The bucking of the bull is how high up bull throws its rear legs, when it kicks backwards with rear legs. The disclosed system can capture the motion of the bull's rear legs and the scoring module can score the bull's buck based on the motion of the bull's rear legs going up and down. Each score has its own unique equations to calculate the score. The very left dial in the drawings shows velocity of the rear legs. The further the line in dial, the higher the legs go. Also, the drawing shows the jumps count, which is also the info that is used to score a bull. Some bulls are more agile, some are less. So, in bull riding, bull also gets its score and separately rider gets his score as well. Each jump is every time bull raises front legs then kicks back with real legs, which is a jump.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for scoring performance of a performer in a sport, the method comprising:
   receiving a video feed of a performance, the performance is by the performer;
   recognizing, by computer vision, predefined body parts of the performer in frames of the video feed;
   determining a geometric center of each body part of the predefined body parts;
   building a framework by connecting the geometric centers of the predefined body parts by projecting a body of the performer in a 2D or 3D space;
   tracking spatiotemporal changes in the framework to determine predefined body movements and positions, wherein the spatiotemporal change in the framework is proportional to movements of body parts in relation to each other; and
   scoring the performance, by a scoring module, wherein the scoring module is based on a deep neural network, the scoring module trained using established rules and standards for scoring.

2. The method according to claim 1, wherein the sport is bull riding, and the performer is a bull with a rider, the predefined body parts comprise a head, hips, knees, and hoofs of the bull.

3. The method according to claim 2, wherein the predefined body parts comprise the rider.

4. The method according to claim 1, wherein the method further comprises:
   converting the frames of the video feed into pixel data, wherein the predefined body parts are recognized as areas in the frames and the pixels associated with the areas.

5. The method according to claim 1, wherein each body part of the predefined body parts is defined and distinguished by a virtual boundary.

6. The method according to claim 1, wherein each part of the predefined body parts is projected as a volume in a 3D cartesian coordinate system, and a resultant vector extends from a geometric center of each volume, wherein the resultant vector is tracked for the spatiotemporal changes.

7. The method according to claim 4, wherein each part of the predefined body parts is projected as an area in a 2D cartesian coordinate system, and a resultant vector extends from a geometric center of each area, wherein the resultant vector is tracked for the spatiotemporal changes.

8. The method according to claim 2, wherein the predefined body movements and positions comprise 360 spins, change of direction, bucking, and movement agility.

9. The method according to claim 3, wherein the predefined body movements and positions comprise 360 spins, change of direction, bucking and movement agility, and absence of the rider on the bull.

10. A system for scoring performance of a performer in a sport, the system configured to implement a method comprising:
    receiving a video feed of a performance, the performance is by the performer;
    recognizing, by computer vision, predefined body parts of the performer in frames of the video feed;
    determining a geometric center of each body part of the predefined body parts;
    building a framework by connecting the geometric centers of the predefined body parts by projecting a body of the performer in a 2D or 3D space;
    tracking spatiotemporal changes in the framework to determine predefined body movements and positions, wherein the spatiotemporal change in the framework is proportional to movements of body parts in relation to each other; and
    scoring the performance, by a scoring module, wherein the scoring module is based on a deep neural network, the scoring module trained using established rules and standards for scoring.

11. The system according to claim 10, wherein the sport is bull riding, and the performer is a bull with a rider, the predefined body parts comprise a head, hips, knees, and hoofs of the bull.

12. The system according to claim 11, wherein the predefined body parts comprise the rider.

13. The system according to claim 10, wherein the method further comprises:
    converting the frames of the video feed into pixel data, wherein the predefined body parts are recognized as areas in the frames and the pixels associated with the areas.

14. The system according to claim 10, wherein each body part of the predefined body parts is defined and distinguished by a virtual boundary.

15. The system according to claim 10, wherein each part of the predefined body parts is projected as a volume in a 3D cartesian coordinate system, and a resultant vector extends from a geometric center of each volume, wherein the resultant vector is tracked for the spatiotemporal changes.

16. The system according to claim 13, wherein each part of the predefined body parts is projected as an area in a 2D cartesian coordinate system, and a resultant vector extends from a geometric center of each area, wherein the resultant vector is tracked for the spatiotemporal changes.

17. The system according to claim 11, wherein the predefined body movements and positions comprise 360 spins, change of direction, bucking, and movement agility.

18. The system according to claim 12, wherein the predefined body movements and positions comprise 360 spins, change of direction, bucking and movement agility, and absence of the rider on the bull.

* * * * *